United States Patent Office 3,017,377
Patented Jan. 16, 1962

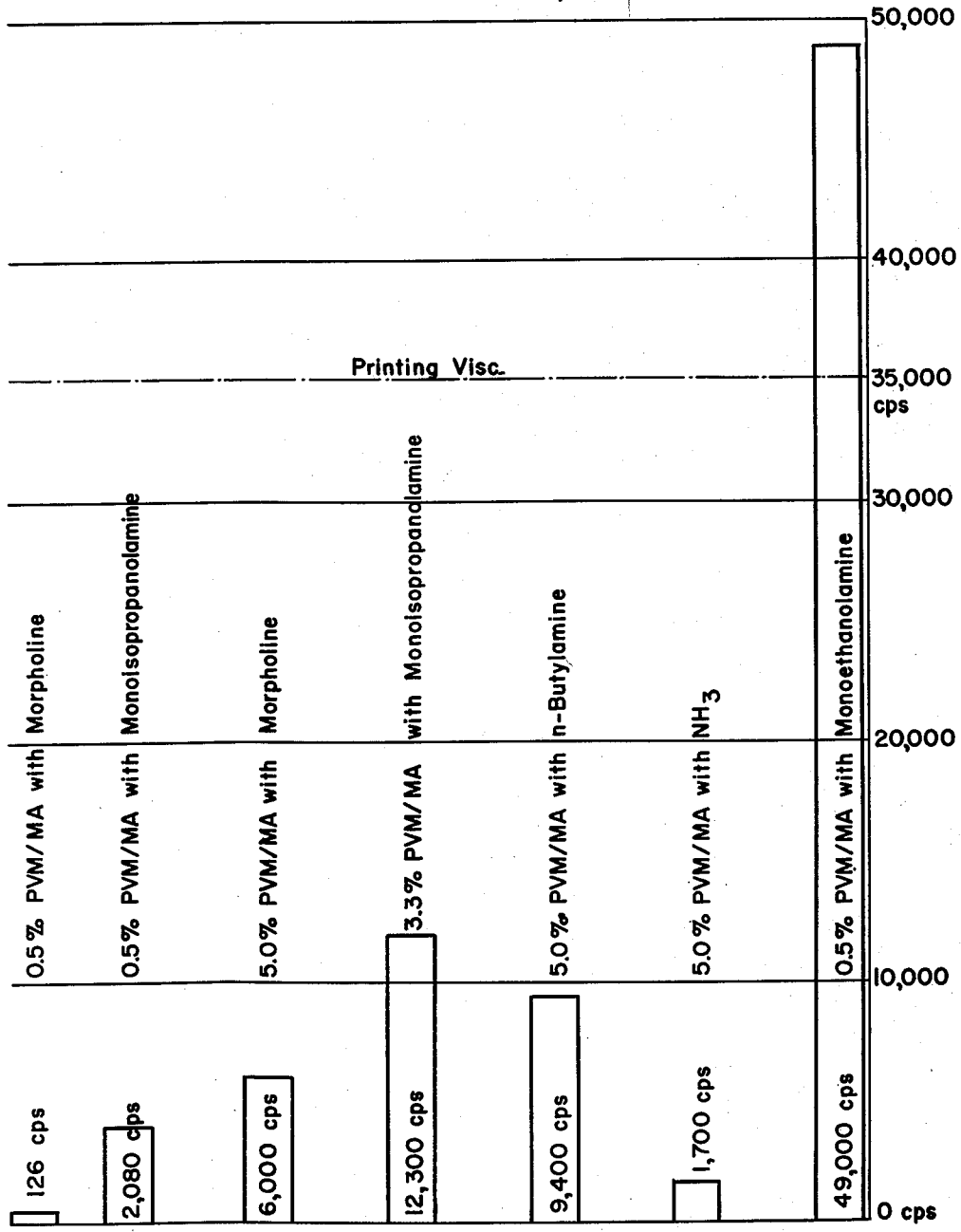

3,017,377
EXTENDER COMPOSITION FOR TEXTILE PRINTING PASTES CONTAINING REACTION PRODUCT OF MONOETHANOLAMINE SOLUTION AND THE CO-POLYMER OF UNHYDROLYZED METHYL VINYL ETHER AND MALEIC ANHYDRIDE
Joseph M. Kuhn, Haddonfield, N.J., assignor to The Sherwin-Williams Company, Cleveland, Ohio, a corporation of Ohio
Filed Mar. 8, 1955, Ser. No. 492,905
3 Claims. (Cl. 260—29.6)

This invention relates to compositions useful in the textile decorating art. More particularly, this invention is concerned with water phase textile printing emulsions.

Most of the successful pigment printing paste compositions are of the water-in-oil type which may be thickened by the addition of water or thinned by the addition of a diluent or solvent for the external phase, e.g., hydrocarbon solvent. The difficulties inherent in compositions in which the external phase is organic in nature include inflammability and difficulty in cleaning the apparatus, for example when it becomes necessary to change colors. Because of these disadvantages much effort has been expended in the development of water phase printing pastes in which water is the external phase and the organic material is stably dispersed therein. A principal difficulty with these compositions, however, is the relatively high cost of what are known as "extenders." These are usually very simple compositions which are emulsions of water and organic material, usually a resin-hydrocarbon mixture together with suitable emulsifying agents. One of the drawbacks of these compositions is that the physical compositions thereof are such that when a color concentrate of the oil-in-water type is admixed with such an "extender," there is a viscosity loss which is too much in the extremely concentrated compositions for satisfactory printing purposes. It is, therefore, necessary to add certain thickeners, such as, methyl cellulose. These compositions are expensive and are not entirely satisfactory.

It is a principal object of this invention, therefore, to provide a composition of matter suitable for use as an extender in water phase (oil-in-water emulsions) printing pastes.

Another object of this invention is to provide a method of decorating textile materials with an improved water phase printing paste.

Other objects of this invention will appear as the description proceeds.

To the accomplishment of the foregoing and related ends, said invention, then, consists of the means hereinafter fully described and particularly pointed out in the appended claims, the following description and annexed drawing setting forth in detail certain illustrative embodiments of the invention, such disclosed means constituting, however, but a few of the various forms in which the principle of this invention may be employed.

Broadly stated, this invention is in the provision of a composition of matter comprising an aqueous medium and from 0.25% by weight to about 2.0% by weight of the reaction product of (a) a solid linear unhydrolyzed co-polymer of methyl vinyl ether and maleic anhydride and (b) monoethanolamine, the amount of monoethanolamine being sufficient to impart a pH of at least 7 to said composition. The product is generally of gel-like consistency if water alone is used. If the aqueous carrying medium is an emulsion of the oil-in-water type, the product has the appearance and consistency approximating that of aerosol dispensed shaving cream.

Polyvinyl methyl ether-maleic anhydride adduct is believed to have the following structure:

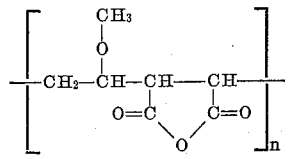

In this formula, $n$ is within the range of from about 20 to about 200. For most purposes, molecular weights of the polymer between about 10,000 and about 15,000 are quite satisfactory, although any solid form of the co-polymer regardless of molecular weight is suitable for the present purposes. This polymeric acid anhydride is a white amorphous powder weighing about 16 lbs. per cubic foot having a specific gravity of about 1.2–1.4. It is soluble in water and alcohols, acetone, methyl ethyl ketone, methyl acetate, etc. It is insoluble in aliphatic and aromatic hydrocarbons and their halogen derivatives, ethyl ether and nitro-paraffins. It hydrolyzes to the acid in water with heating and absorbs moisture from the atmosphere. This material is currently available on the market from General Aniline and Film Corp.

Being acidic in nature, it is expected that such a material would show the normal reactions of an acid toward basic materials and indeed, polyvinyl methyl ether-maleic anhydride adduct (hereinafter referred to as PVM/MA) shows the typical acid reactivity toward bases both organic and inorganic, and alcohols, etc.

In the annexed drawing, there is shown the results obtained when various organic bases are reacted with unhydrolyzed PVM/MA and the viscosity of dilute aqueous solutions are obtained. The behaviour is most unusual and unexpected in the case of the reaction product of unhydrolyzed PVM/MA with monoethanolamine. This graph shows that a 0.5% solution of PVM/MA=monoethanolamine reaction product has a viscosity of 49,000 centipoises. A corresponding composition made from PVM/MA and monoisopropylamine, an analogue of monoethanolamine, produces a composition having a viscosity of 2,080 centipoises. At 3.3% concentration in water, the PVM/MA=monoisopropylamine reaction product has a viscosity of 12,300 centipoises or about ¼ the viscosity of the monoethanolamine product. Normal printing viscosity is about 35,000 centipoises.

A number of other materials were tried including morpholine, n-butylamine and ammonia. These materials gave measurable viscosities at .5% and 5% concentrations. However, such products all showed viscosities less than 10,000 centipoises. Several other materials failed to form water soluble salts. These included diisopropylamine, tri-isopropylamino ethyl ethanolamine, propylene diamine, 2-amino-2-methyl-1-propanol, and urea. Triethanolamine upon reaction with PVM/MA yields a water-thin solution over a wide range of concentrations. Diethanolamine does not show the marked improvement of monoethanolamine.

It has been found, therefore, that among the amines and hydroxylamines which are reactive with PVM/MA, only one, namely, monoethanolamine, at very low reaction product concentrations, yields aqueous gels having viscosities well above those normally obtained in such reactions.

The exact nature of the reaction between the PVM/MA and the monoethanolamine is not known. One theory is as follows: The amount of monoethanolamine is usually in excess of that required to fully neutralize the acidic polymer. The unhydrolyzed polymeric acid anhydride reacts with amino alcohols in a manner different from the reaction of such amino alcohols with the corresponding acid. With the polymeric anhydride the amino alcohol reacts with one carboxyl group to form the half-acid amide and releases a hydrogen atom to the other carboxyl radical. The second carboxyl group then reacts with an additional mol of the monoethanolamine to form the half amine-salt. The resulting half-acid amide—half amine salt is believed to produce the unusual product. Such a theory aids in explaining why the triethanolamine reaction product is a water-thin liquid. The non-availability of active hydrogen in the tertiary type amine leads to the formation of the water soluble amine salt. Likewise, the reaction of the hydrolyzed acid polymer with the monoethanolamine yields a poor product because the acid form favors the formation of the salt rather than the amide.

The procedure for compounding these compositions is simple. To an aqueous solution of monoethanolamine containing from about .3 to about 1.25% monoethanolamine by weight is added fresh or unhydrolyzed PVM/MA in an amount sufficient to yield a composition having a pH of at least 7 up to about 11. The reaction is completed by simple admixture with stirring. Ordinarily the addition of PVM/MA on a weight for weight basis with the monoethanolamine produces a satisfactory composition. When compounded within the indicated ranges, aqueous gels having viscosities of from 30,000 to 60,000 centipoises are obtained.

Instead of a water solution of monoethanolamine, there may be prepared alternatively a water emulsion of the oil-in-water type using a hydrocarbon, the water phase having dissolved therein from about .3% to about 1.25% of monoethanolamine. The reaction with PVM/MA proceeds in substantially the same manner using the emulsion base. Emulsion compositions are illustrated by the following examples:

|  | 1 | 2 | 3 | 4 | 5 | 6 | 7 |
|---|---|---|---|---|---|---|---|
| Water | 686 | 686 | 696 | 696 | 696 | 696 | 696 |
| 20% Protein Solution | 40 | 40 |  |  |  |  |  |
| Monoethanolamine | 6 | 6 | 16 | 16 | 16 | 16 | 16 |
| Mineral Spirits | 262 |  | 262 |  |  |  |  |
| Kerosene |  |  |  | 262 |  |  |  |
| Turpentine |  |  |  |  | 262 |  |  |
| Xylol |  | 262 |  |  |  | 262 |  |
| Dipentine |  |  |  |  |  |  | 262 |
| Oleic Acid |  |  | 20 | 20 | 20 | 20 | 20 |
| PVM/MA | 6 | 6 | 6 | 6 | 6 | 6 | 6 |
|  | 1,000 | 1,000 | 1,000 | 1,000 | 1,000 | 1,000 | 1,000 |

Method: The 20% protein solution may be prepared as follows:

| | |
|---|---|
| Water | 733 |
| Sodium o-phenylphenate | 15 |
| Sodium pentachlorophenate | 15 |
| Mix and heat in jacketed starch kettle to 131° F. (55° C.) and add: | |
| Low viscosity soya protein | 200 |
| Mix and wet out and recover temperature to 131° F. (55° C.) and add: | |
| Concentrated ammonia (27%, NH₃) | 37 |
| Mix and hold at 131° F.–140° F. (55–60° C.) for 20 minutes. Cool and adjust for loss. | |
| Parts by weight | 1,000 |

In Examples 1 and 2 the protein solution and monoethanolamine are mixed into the water. Into this are emulsified 232 parts of solvent, using a high speed homogenizing type mixer.

Into the remaining 30 parts of solvent are mixed the 6 parts of PVM/MA until a smooth slurry is obtained, also using a high speed mixer. This slurry is then mixed rapidly into the above emulsion. The reaction between the monoethanolamine and PVM/MA thickens the emulsion to a workable printing consistency.

In Examples 3, 4, 5, 6 and 7 the monoethanolamine is mixed into the water, and the oleic acid is mixed separately into 232 parts of the solvent which is then added gradually to the solution of monoethanolamine with high speed mixing until the emulsion is complete.

The remaining 30 parts of solvent and the 6 parts of PVM/MA are made into a slurry as described in the preparation of Examples 1 and 2. This slurry is added to the above emulsion with high speed mixing and the necessary thickening then takes place.

Other hydrocarbons of the normally liquid type having boiling points with the range 50° C. to 300° C. may be used, e.g., toluene, benzene, decene, and petroleum distillates of various boiling points within this range.

Reference has been had to the fact that the PVM/MA is unhydrolyzed. It has been shown that if the PVM/MA is previously hydrolyzed and then reacted with monoethanolamine very little, if any, viscosity improvement is obtained. Hence, the PVM/MA must be unhydrolyzed prior to reaction.

The following are illustrative examples of extender compositions made in accordance with this invention.

EXAMPLE 8

| | Parts |
|---|---|
| Unhydrolyzed PVM/MA Sp. Vis. 3.25 | 10 |
| Water | 970 |
| Monoethanolamine | 10 |
| Mineral oil | 10 |

EXAMPLE 9

| | |
|---|---|
| Unhydrolyzed PVM/MA Sp. Vis. 3.25 | 10 |
| Water | 940 |
| Monoethanolamine | 10 |
| Mineral oil | 40 |

EXAMPLE 10

| | |
|---|---|
| Unhydrolyzed PVM/MA Sp. Vis. 3.25 | 9 |
| Water | 960 |
| Monoethanolamine | 10 |
| Kerosene | 18 |
| Pine oil | 3 |

EXAMPLE 11

| | |
|---|---|
| Unhydrolyzed PVM/MA Sp. Vis. 3.25 | 10 |
| Water | 950 |
| Monoethanolamine | 10 |
| Oil modified alkyd resin solution (50% xylene) | 30 |

EXAMPLE 12

| | |
|---|---|
| Unhydrolyzed PVM/MA Sp. Vis. 3.25 | 10 |
| Water | 950 |
| Monoethanolamine | 10 |
| Raw castor oil | 30 |

EXAMPLE 13

| | |
|---|---|
| Unhydrolyzed PVM/MA Sp. Vis. 0.52 | 10 |
| Water | 950 |
| Monoethanolamine | 10 |
| Light mineral oil | 30 |

EXAMPLE 14

| | |
|---|---|
| Unhydrolyzed PVM/MA Sp. Vis. 1.32 | 10 |
| Water | 950 |
| Monoethanolamine | 10 |
| Light mineral oil | 30 |

EXAMPLE 15

| | |
|---|---|
| Unhydrolyzed PVM/MA Sp. Vis. 2.15 | 10 |
| Water | 950 |
| Monoethanolamine | 10 |
| Light mineral oil | 30 |

EXAMPLE 16

| | |
|---|---|
| Unhydrolyzed PVM/MA Sp. Vis. 2.3 | 10 |
| Water | 950 |
| Monoethanolamine | 10 |
| Light mineral oil | 30 |

EXAMPLE 17

| | |
|---|---|
| Unhydrolyzed PVM/MA Sp. Vis. 3.25 | 10 |
| Water | 980 |
| Monoethanolamine | 10 |

In the foregoing examples the parts are by weight. The viscosity of these extenders ranges from 30,000 to 120,000 c.p.s. at 24° C. as determined on the Brookfield viscometer. The variation in viscosities depends on the specific viscosity PVM/MA and its purity. The oil or oily component which is present in the foregoing compositions is not essential but it is convenient in handling the powdery, fluffy PVM/MA to wet it down with an oily material, such as light mineral oil and the like. In the final composition, whether based on water or a water emulsion of a hydrocarbon, the oil so used apparently remains homogeneously dispersed or enters the hydrocarbon phase.

The foregoing extenders may be blended with any of the colors prepared according to Patents 2,539,914, specifically Examples 1, 2 and 3, and 2,627,507, specifically Examples 1 through 12 inclusive. The resulting products will be printing pastes suitable for use in decorating textile materials. Of course, other water dispersed pigments and resin emulsions than those specifically disclosed in the aforementioned patents may be used.

In using the extenders of the present invention to produce the improved textile decorating compositions, the amount and kind of extender assumes some importance. The colors referred to in the aforementioned patents are usually prepared in highly concentrated form. Most usually, the printer will desire to "let down" the concentrated printing paste to give a lighter color. Most usually, the concentrated pigmented printing pastes of the oil-in-water type are cut with an extender in a weight ratio within the range of from about 1:1 to 1:100 or more. If the color desired by the printer is a deep shade, i.e., the dilution with extender is to be about 1:1 to 1:20, then best results are secured if the extenders shown in Examples 1 to 7 above are used. In this emulsion the mineral spirits is in the internal phase. It has been found that the substitution of the emulsion type extender for the aqueous dispersion type prevents too much bleeding through of color to the reverse side of the printed fabric. Also, there is a tendency to smooth out the print and avoid a thready appearance.

If the color is to be very dilute, i.e., within the range of from 1:80 to 1:100 or more, then the aqueous extender such as shown in Examples 8 to 17 above may be used.

In the intermediate ratios, i.e., 1:20 to 1:80, either type of extender can be used as may be desired.

In any event, the concentration of PVM/MA=monoethanolamine compound in these extenders is in the range of from about 0.25% to about 2.0%, the most usual concentration being approximately ½ of 1%. It will be appreciated, therefore, that tremendous viscosity increases are secured with very small amounts of material. Where the emulsion type of extender is used, the cost is very much less than currently available extender compositions. The cost of the aqueous non-emulsion extenders is about ½ that of the emulsion type extenders.

Another advantage of the compositions of the present invention is concerned with the amount of latex which may be added. Frequently such latices are added to these compositions to improve the resistance of the color on the fabric surface to removal by rubbing, i.e., "crock." Using the water phase system as improved in accordance with the present invention, almost any amount of latex, e.g., acrylonitrile-butadiene latex (40%–60% solids) can be added. With the water-in-oil type of printing pastes, only a limited amount of such latex can be added. Specific examples of printing pastes ready for use are as follows:

EXAMPLE 18

Part 1

450 grams of copper phthalocyanine blue press cake (100 grams of dry pigment) are flushed into 163 grams of butylated melamine formaldehyde resin, and 294 grams of water are separated and removed as a result of the flushing. The resin is composed of 50 parts of melamine-formaldehyde resin, 30 parts of butyl alcohol and 20 parts of xylene. The resin alone might be used or other resins such as urea-formaldehyde, or other such urea-aldehyde type resins.

In a separate vessel, 157 grams of the same melamine-formaldehyde resin, 330 grams of a petroleum hydrocarbon having a boiling range of 154° to 194° C., 150 grams of ethyl cellulose (10 cp. Standard ethoxy) are mixed until the ethyl cellulose is dissolved. A cloudy, thick liquid is produced.

The contents of the separate vessels are then mixed together and roller milled until the product has a smooth consistency.

To every five parts of this product is added and thoroughly mixed one part of an emulsifier, such as, the various polyethylene oxide condensation products, sorbitan mono-oleate polyoxyalkylene derivatives, triethanolamine oleate, or the like, followed by the gradual addition of five parts of water.

This product is a concentrated lacquer-in-water type textile finishing composition.

Part 2

To produce useful printing compositions, one part of the foregoing color concentrate may then be admixed as by simple stirring with one part of the extender described in Example 3 above to produce a very deep shade of blue. If a lighter shade of blue is desired, the amount of extender such as shown in Example 3 above may be increased to as much as 100 parts or more per part of the concentrated blue color.

EXAMPLE 19

Part 1

A concentrated green textile printing paste is made according to the following formula and steps: 233 grams of a press cake of the iron salt of nitrosobetanaphthol (100 grams of dry pigment), and 100 grams of water are mixed to a smooth paste. To this are added 175 grams of the same melamine-formaldehyde resin used in Example 18 above. The ingredients are mixed and the pigment flushed into the organic phase with the removal of 80 grams of water. There are then added an additional 25 grams of the melamine-formaldehyde resin and 297 grams of turpentine. This composition is passed through a colloid mill.

530 grams of the paste prepared above are mixed with 35 grams of oleic acid, 143 grams of melamine-formaldehyde resin (as above), 143 grams of 25% ethyl cellulose solution (10 cp. Standard ethoxy), 35 grams of octyl alcohol and 114 grams of 65% bis (2-ethyl hexyl) sodium sulphosuccinate in butyl Cellosolve (monobutyl ether of ethylene glycol).

Neither the oleic acid nor the octyl alcohol is essential. The turpentine is present as a solvent for the melamine-formaldehyde resin. Other pigments and other solvents may be employed.

Part 2

The concentrated color thus produced may be extended with any of the foregoing extenders, for example in accordance with the following formula:

| | Grams |
|---|---|
| Green paste (as above) | 2 |
| Butadiene-acrylonitrile latex (50% solids) | 1 |
| Extender (Example 10 above) | 50 |
| Water | 49 |

EXAMPLE 20

| | Grams |
|---|---|
| Lithosol Violet (a water dispersed vat dyestuff paste) | 5 |
| Padding emulsion | 5 |
| Extender (Example 12 above) | 100 |

The padding emulsion referred to in this example had the following composition by weight:

| | Percent |
|---|---|
| Butylated melamine-formaldehyde resin | 16.3 |
| Butyl alcohol | 10.8 |
| Triton X–100 (ethylene oxide condensation product) | 5.0 |
| Dibutyl phthalate | 2.5 |
| Ethyl cellulose (10 c.p.) | 8.0 |
| Ammonia (28° bé.) | 1.5 |
| Water | 55.9 |

These pastes may be printed by means of an intaglio engraved roll, a surface printing machine or by the silk screen method. Following printing, the decorated textile is dried and heated at an elevated temperature to obtain fastness.

EXAMPLE 21

Part 1

In this example there was used a solvent-free solid form of butylated melamine-formaldehyde resin known as Resimene 888. The materials employed in making the color concentrate with brief indications as to the steps are as follows:

1,466 gms. of copper phthalocyanine blue press cake (300 gms. pigment)
150 gms. of a 50% aqueous solution of a sodium salt of a naphthalene sulphonic acid, formaldehyde condensation product (Blancol). Mix to disperse.

150 gms. monobutyl ether of ethylene glycol [1]
240 gms. Resimene 888 [1]
240 gms. Dibutyl Phthalate [1]

[1] Premix to dissolve.

Flush and remove 1273 gms. of water and monobutyl ether of ethylene glycol. Add:

500 gms. of water. Wash and remove 544 gms. water.
150 gms. ethyl cellulose (10 cp. Standard ethoxy). Mix until dissolved.
166 gms. oleic acid
83 gms. monoethanolamine
1425 gms. water
37 gms. ammonia (27% aqueous NH₃)

Other pigments may, of course, be employed.

The pigmented resin plasticizer mixture was very well dispersed in water and found to remain stable on storage for periods up to two to three years. This printing paste color concentrate contains no water insoluble volatile organic solvents.

Part 2

The foregoing color concentrate may be let down with any of the extenders shown in the previous Examples 1 to 17 to yield any desired shade of blue. For example, a blue may be produced in accordance with the following formula:

| | Parts |
|---|---|
| Blue printing paste as per this example | 1 |
| Extender (Example 17) | 100 |

The alkylated melamine-formaldehyde condensation products which are useful in forming these concentrated color pastes may be prepared by known methods. For example, reference may be had to the patent to Widmer, 2,197,357 and the patent to Swain, Re. 22,402. In general, these condensation products are prepared by reacting 2 to 6 mols of formaldehyde with 1 mol of melamine. The condensation product formed is believed to be mostly methylol-melamine.

When preparing the various alkylated melamine-formaldehyde condensation products, it is frequently desired to prepare first the methylated methylol-melamine and then, by an interchange process utilizing an aliphatic alcohol of the desired carbon atom content, e.g., 3 to 12 carbon atoms, obtain the corresponding "alkylated methylol melamine." Specific examples of such treatment are given in the patent to Johnstone et al., Re. 22,566.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A composition of matter comprising water and from 0.25% to about 2.0% by weight of the entire composition of the reaction product of (a) a solid linear unhydrolyzed co-polymer of methyl vinyl ether and maleic anhydride and (b) monoethanolamine, the amount of monoethanolamine being sufficient to impart a pH of at least 7 to said composition.

2. An extender for oil-in-water textile printing pastes comprising the aqueous reaction product formed by stirring together:
   (a) an approximately 0.3 to 1.25% water solution of monoethanolamine
   (b) a solid linear unhydrolyzed co-polymer of methyl vinyl ether and maleic anhydride in a quantity no greater than that which will yield an aqueous product having a pH of at least 7.

3. A composition of matter comprising an oil-in-water emulsion of a normally liquid hydrocarbon having a boiling point within the range of from 50 to 300° C. with water, and from about 0.25% to about 2% by weight of the entire composition of the reaction product of (a) a solid linear unhydrolyzed copolymer of methyl vinyl ether and maleic anhydride and (b) monoethanolamine, the amount of monoethanolamine being sufficient to impart a pH of at least 7 to said composition.

References Cited in the file of this patent

UNITED STATES PATENTS

| | | |
|---|---|---|
| 1,976,679 | Fikentscher et al. | Oct. 9, 1934 |
| 2,047,398 | Voss et al. | July 14, 1936 |
| 2,313,565 | McDowell et al. | Mar. 9, 1943 |
| 2,361,277 | Enderlin et al. | Oct. 24, 1944 |
| 2,607,762 | Bowen | Aug. 19, 1952 |
| 2,609,350 | Spatt | Sept. 2, 1952 |
| 2,746,837 | Kirk | May 22, 1956 |